(12) United States Patent
Saripalli

(10) Patent No.: US 8,352,656 B2
(45) Date of Patent: Jan. 8, 2013

(54) HANDLING ATOMIC OPERATIONS FOR A NON-COHERENT DEVICE

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 12/756,315

(22) Filed: Apr. 8, 2010

(65) Prior Publication Data
US 2011/0252168 A1 Oct. 13, 2011

(51) Int. Cl.
G06F 13/24 (2006.01)
(52) U.S. Cl. .................. 710/105; 710/100; 711/154
(58) Field of Classification Search .......... 710/105, 710/100; 711/154
See application file for complete search history.

(56) References Cited

U.S. PATENT DOCUMENTS 6,009,488 A 12/1999 Kavipurapu
6,721,813 B2 * 4/2004 Owen et al. ............... 710/6
2008/0080491 A1 4/2008 Saripalli
2008/0120487 A1 5/2008 Saripalli
2009/0037614 A1 2/2009 Saripalli
2009/0037624 A1 2/2009 Saripalli

OTHER PUBLICATIONS

Darren Abramson, et al., "Intel Virtualization Technology for Directed I/O," Austin 10, 2006, pp. 178-193.
Hewlitt-Packard, Intel, Advanced Micro Operations, IBM, "Atomic Operations," Jan. 15, 2008, pp. 1-26.
U.S. Appl. No. 12/748,544, filed Mar. 29, 2010, entitled, "Reducing Packet Size in a Communication Protocol," by Phanindra K. Mannava, et al.

* cited by examiner

Primary Examiner — Brian Misiura
Assistant Examiner — Kim Huynh
(74) Attorney, Agent, or Firm — Trop, Pruner & Hu, P.C.

(57) ABSTRACT

In one embodiment, the present invention includes a method for receiving a non-coherent atomic request from a device coupled to an agent via a non-coherent link, accessing a mapping table of the agent to convert the non-coherent atomic request into a coherent atomic request, and transmitting the coherent atomic request via a coherent link to a second agent coupled to the agent to cause the second agent to be a completer of the non-coherent atomic request. Other embodiments are described and claimed.

20 Claims, 4 Drawing Sheets

HANDLING ATOMIC OPERATIONS FOR A NON-COHERENT DEVICE

BACKGROUND

Modern computer systems are realized by the interconnection of various components including processors, memory devices, peripheral devices and so forth. To enable communication between these different components, various links may be present to interconnect one or more of the devices together. Systems can include many different types of interconnects or links. Typically, there is a given communication protocol for each particular type of link, and communications occurring on such link are according to this protocol. In many systems, links may include coherent links and non-coherent links. A coherent link is typically used for tightly coupled components, where the corresponding protocol provides for coherent transactions such that a consistent view of data that may be cached in various locations can be maintained. In contrast, in a non-coherent communication protocol, communications may not occur in a cache coherent manner Atomic operations enable synchronization mechanisms that can be useful in situations with multiple producers and/or consumers that are to be synchronized in a non-blocking fashion. Atomic operations also enable lock-free statistics counters, for example, where a device atomically increments a counter, and host software atomically reads and clears the counter. Compared to locking transactions, atomic operations can provide lower latency and higher scalability than other interconnect traffic.

In the Peripheral Component Interconnect Express (PCIe™) protocol, atomic operations were first introduced as an Engineering Change Notice entitled "Atomic Operations" dated Jan. 15, 2008 (ECN). While the benefits of atomic operations (also referred to herein as "atomics") are highly dependent on the application and usage models, it is expected that accelerators, high-end graphics and high performance computing (HPC) would benefit from platform support for atomics.

In general, atomic operations according to the PCIe™ protocol provide for a single transaction to target a location in memory space, read the location's value, potentially write a new value to the location, and return the original value. This read modify and write sequence to the location is performed atomically while at a lower latency than locking operations. In many instances performing an atomic in a complex system may cause a very large and non-deterministic latency to occur as the completion of the atomic operation may require a number of remote memory transactions of unknown latency.

DETAILED DESCRIPTION

Figure 1:
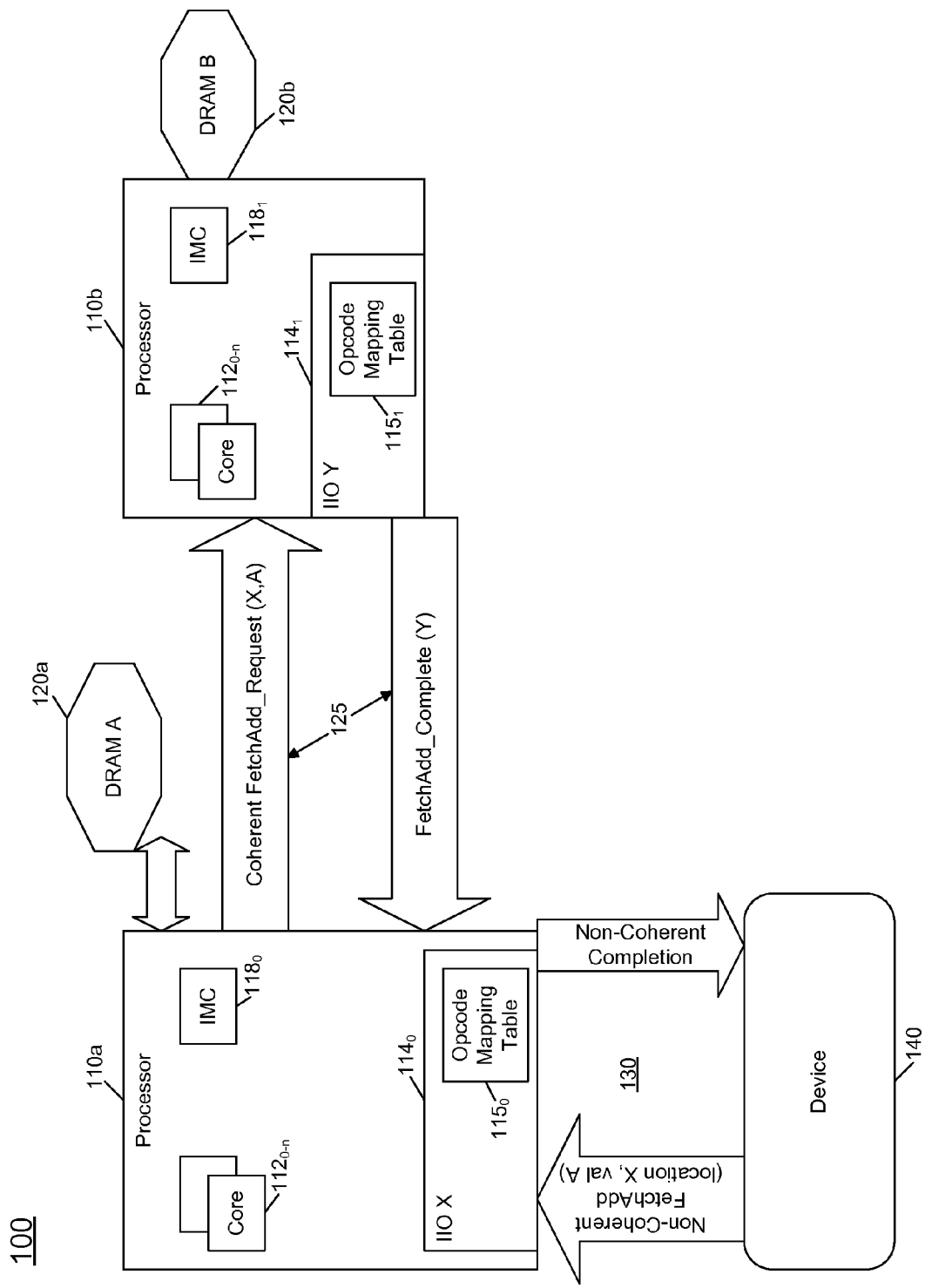
FIG. 1 is a block diagram of a system in accordance with an embodiment of the present invention.

In various embodiments, techniques may be provided to implement atomic operations more efficiently on a platform. In many implementations, the atomic operations may be in accordance with the atomic operation capability of PCIe™ protocol. In particular, embodiments may specifically focus on supporting device-issued atomics ("bus master requests") in which a device, e.g., an input/output (IO) device coupled to a platform via an IO controller (IOH) is the requester and the IOH, also generally referred to herein as a chipset, is the completer.

Such atomic operation requests may be received in the platform via a non-coherent interconnect, e.g., a PCIe™ link, and may be processed in the platform using one or more coherent interconnects of the platform. As one example, an Intel™ Quick Path Interconnect (QPI) link may be the coherent interconnect to connect processor and IOH. For some implementations, platforms may use other internal coherent interconnects to connect one or more cores with uncore logic and use a QPI link to connect sockets. Other platforms that use node controllers to connect nodes to create coherent platforms may use proprietary or standard backplanes/interconnections to transport data. Embodiments also may be applied to other coherent interconnects such as HyperTransport™ or RapidIO™ links. Embodiments also equally apply to many different platform types such as a single socket platform with an integrated IO controller (IIO) as well as dual processor (DP) platforms with two sockets and an integrated IO controller in each socket, or such platforms having a separate chipset include IOH functionality.

As mentioned above, atomic operations can enable advanced synchronization mechanisms that may be useful when there are multiple producers and/or consumers to be synchronized in a non-blocking fashion. For example, multiple producers can safely enqueue to a common queue without any explicit locking.

A compare and swap (CAS) is an atomic operation where the value of a target location is compared to a specified value, and if they match, another specified value is written back to the location. Regardless, the original value of the location is returned to the requester.

In a FetchAdd operation, both a fetch and add occur. More specifically, the value of a target location is incremented by a specified value (e.g., using two's complement arithmetic ignoring any carry or overflow), and the result is written back to the location. In addition, the original value of the location is returned to the requester.

In a swap, an unconditional swap may occur, in which a specified value is written to a target location, and the original value of the location is returned to the requester.

To support atomics, operations such as below may be performed via the chipset responsive to an incoming atomic operation. The specific example described is a FetchAdd operation of the following form: FetchAdd (Location, Addvalue), where Location is the physical address that is the target of the operation and Addvalue is the value to be added to the location. However, embodiments may be applied to any type of atomic operation.

The operations performed by the completer to handle this atomic may be as follows, using QPI memory transactions as an example of coherent transactions that can be used to fulfill the atomic request. First, a lock on the memory location is acquired and possibly all flows are quiesced to maintain atomicity. Then the following operations may be performed, in which the data at the requested location is read, an arithmetic operation is performed, and then a write transaction occurs, as follows:

X=QPI_Read(Location)
Y=X+Addvalue
QPI_Write(Location, Y).

Finally, a completion is returned to the requester that provides the value X.

The primitives QPI_Read and QPI_Write perform either snoop or non-snoop read/write (R/W) memory cycles on the coherent interconnect to access the memory ranges that are the target of the operation. As can be seen from the above steps, depending on the coherent interconnect bandwidth, the usage and load factor, these operations can take a relatively long time. In addition, the operations may need to be routed across the coherent link to another socket, potentially by node controllers. As such, by having a root complex or other entity directly coupled to the requester act as completer, the atomic operation can behave non-deterministically.

This non-deterministic latency may occur in part due to the uncertainty as to where the target memory exists. Assume as one example a multi-socket platform with a device coupled to a chipset which acts as a root complex. First, the chipset determines the location of the address range targeted by the atomic operation. This range may be present in memory coupled to a different processor socket. Thus the chipset that is hosting the root complex for this device may access a direct memory access (DMA) mapping engine to determine from an incoming virtual address of the request that the corresponding physical address is a remote memory. Then a number of memory transactions on the coherent interconnect may occur. Upon receipt of the requested data, the chipset (i.e., the root complex for the device) will perform the atomic operation as the completer of the atomic operation. As such the root complex has to not only handle the atomic functionality, but also perform transactions to obtain needed virtual translations, if not present in the root complex. Note that this functionality may result in one or more transactions being sent from the chipset to a corresponding processor, and if the processor does not have the page tables associated with the requested address present in a cache, then further transactions are needed to obtain the needed translations, which add latency and non-determinism to the atomic operation. In a many-socket system, latency can be especially reduced, as the need to perform address translations in each socket to determine if the target memory location is present locally can be avoided. Instead, the only place that a translation is performed is in the socket of the final destination, i.e., the owner of the target memory location.

Accordingly, in various embodiments a completer may use a coherent opcode corresponding to the received atomic operation to route the request directly to the owning memory range, where it is completed and values (if any) returned as part of a coherent completion. In an embodiment for a QPI interconnect for performing a FetchAdd operation, the coherent opcode to route the request may be referred to as a QPI_FetchAdd_Request, and another opcode called QPI_FetchAdd_Completion may be used to indicate the completion of the request and provide any data. In one embodiment, the semantics of this QPI_FetchAdd_Request can be the same as the PCIe™ FetchAdd atomic operation.

To provide this mapping between various non-coherent atomic operations and coherent atomic operations, a corresponding opcode can be used in a coherent system and which may be routable across links by routing elements (e.g., CPU, IOH and node controllers). As such, coherent routable opcodes may be provided to map to corresponding atomics on a non-coherent link. In other embodiments, a generic routable opcode may be provided that has enough differentiating parameters to tunnel the various opcodes corresponding to the non-coherent atomics and provide future headroom. By mapping an opcode from a non-coherent interconnect to an equivalent opcode on the coherent interconnect, reduced memory bandwidth can be realized.

Embodiments may thus enable a reduction in the number of memory operations that need to be performed in order to support atomic operations. That is, instead of converting a non-coherent atomic operation into at least two coherent memory operations that potentially have to be communicated across a coherent interconnect, embodiments may provide for a corresponding opcode (routable) that acts as a proxy for the non-coherent atomic operation.

When the routable opcode reaches the actual destination, the opcode is completed at the final destination (corresponding to an owner of the target memory location), where the memory is accessed with very little latency and the results are returned across the coherent interconnect. Once the result is received, the completer can complete the original non-coherent atomic transaction and return a completion (if required). As such, an atomic of a non-coherent protocol can be tunneled through a coherent interconnect.

Referring now to FIG. 1, shown is a block diagram of a system in accordance with an embodiment of the present invention. As shown in FIG. 1, system 100 may be a multi-processor system. Many different implementations of a multi-processor system are possible. For example, a desktop or server platform may include multiple processor sockets that are in communication with each other by a coherent interconnect system. Alternately, a multi-node system may be present in which each processor is of a separate node, and connected, e.g., by a node controller or network interface controller (NIC). As such, many different manners of interconnecting the components of system 100 are possible depending on a particular platform architecture.

For purposes of generality, the multi-processor system of FIG. 1 is described with connections that are either non-coherent (e.g., such as a PCIe™ link) or coherent (e.g., such as a QPI or other coherent link). Thus as seen in FIG. 1, processor $110_a$ may be in communication with processor $110_b$ via a coherent interconnect 125. As one example, this link may be a point-to-point link, e.g., a QPI link although bus-based configurations are also possible.

Each processor 110 may include one or more cores. Specifically shown are a plurality of cores $112_0$-$112_n$, which may be directly interconnected, e.g., via coherent links or may be connected through other components such as uncore logic. As further seen, each processor may include an integrated IO controller (IIO) 114 which may be used to provide integrated chipset functionality to enable communication with peripheral devices such as a device 140, which may be any type of desired peripheral device. As seen, communication with device 140 may be via a non-coherent interconnect 130. As will be discussed further below, IIO 114 may include an opcode mapping table 115. In addition, each processor 110 may further include an integrated memory controller (IMC) 118, which may be in communication with a portion of system memory locally coupled to the corresponding processor. In one embodiment, local memory 120 may be dynamic random access memory (DRAM) although the scope of the present invention is not limited in this regard. While described with this high level implementation for ease of illustration in the embodiment of FIG. 1, understand that a system may include many other components.

Embodiments may provide for improved efficiency of atomic operations initiated from a non-coherent connected device such as device 140. This flow of operation is also shown in FIG. 1. To begin operation, device 140 may issue an atomic operation that targets a desired memory location. While this location may be anywhere within the system, assume for purposes of explanation that the request is for a target location in memory $120_b$ locally coupled to processor $110_b$. As seen, the flow of this atomic memory request (which for purposes of discussion is a FetchAdd) is directed to IIO $114_0$, which acts as the root complex for device 140. The format of this atomic operation is: FetchAdd "location X, val A" where location X is the requested target memory location (and which may be in the form of a virtual address) and val A is an operand to be used in the atomic operation. Since IIO 114 is the root complex for device 140, conventionally it would handle the atomic operation as the completer, sending memory requests to obtain the data at the memory location, perform the operation, potentially sending further memory requests to the target memory location, and then finally sending a completion to device 140. As discussed above, such operations can lead to a high and non-deterministic latency.

Thus in various embodiments, to avoid such latency and non-determinism, IIO $114_0$ may map the incoming non-coherent atomic operation to a coherent atomic operation and forward the request onto an owner of the requested memory location to enable the operation to be directly performed locally to the memory location (i.e., by the owner agent of the memory) to avoid non-deterministic behavior and reduced latency. To this end, IIO $114_0$ may access opcode mapping table $115_0$ to obtain a coherent atomic opcode corresponding to the received non-coherent atomic opcode.

Thus as seen in FIG. 1, IIO $114_0$ may generate and transmit a coherent atomic request via interconnect 125. More specifically, a coherent FetchAdd request may be sent which includes all the information to enable routing the request to the correct destination. In this way, the need for coherent read/write operations to obtain requested data and then later to provide result data back to the target memory location can be avoided.

Still referring to FIG. 1, it is seen that the coherent atomic request is received by processor $110_b$ and may be handled by IIO $114_1$ to perform the requested operation(s). Thus in this instance, IIO $114_1$ may act as the completer to obtain the requested data at the target location, perform the requested operation, provide the result back to memory and then to provide a completion via interconnect 125 back to processor $110_a$. In this way, because IIO $114_1$ is local to the target memory $120_b$, reduced latency in accessing the memory to obtain the needed data (e.g., a second operand) and to then write the result back to memory can occur. To enable these operations to occur in IIO $114_1$, access similarly may be made to opcode mapping table $115_1$ to receive the coherent atomic operation and perform the requested operations. Again using this mapping table, the result may be transmitted back to processor $110_a$ via a coherent atomic completion opcode obtained from the mapping table.

When IIO $114_0$ receives the completion, access again may be made to opcode mapping table $115_0$ to obtain a non-coherent completion opcode to send the result back to device 140 via interconnect 130. While shown with this particular implementation in the embodiment of FIG. 1, the scope of the present invention is not limited in this regard.

Thus in various embodiments, more efficient handling of atomic operations originating from a non-coherent-connected device can be realized. As seen in the above discussion, in some embodiments at least three different agents are used in performing the operations, namely the originating agent, a receiving agent, which may be the root complex to which the device is coupled, and a target agent, which may be an agent locally coupled with the target memory location. Of course, in many situations additional agents may be interconnected between the root complex and the target agent. Still further, in some systems opcodes corresponding to these atomic operations can be sent across scalable node controllers that connect multiple devices in a coherent system. In this way, atomic operations can be targeted to memory locations owned by a processor that are coupled to a scalable node controller.

Figure 2:
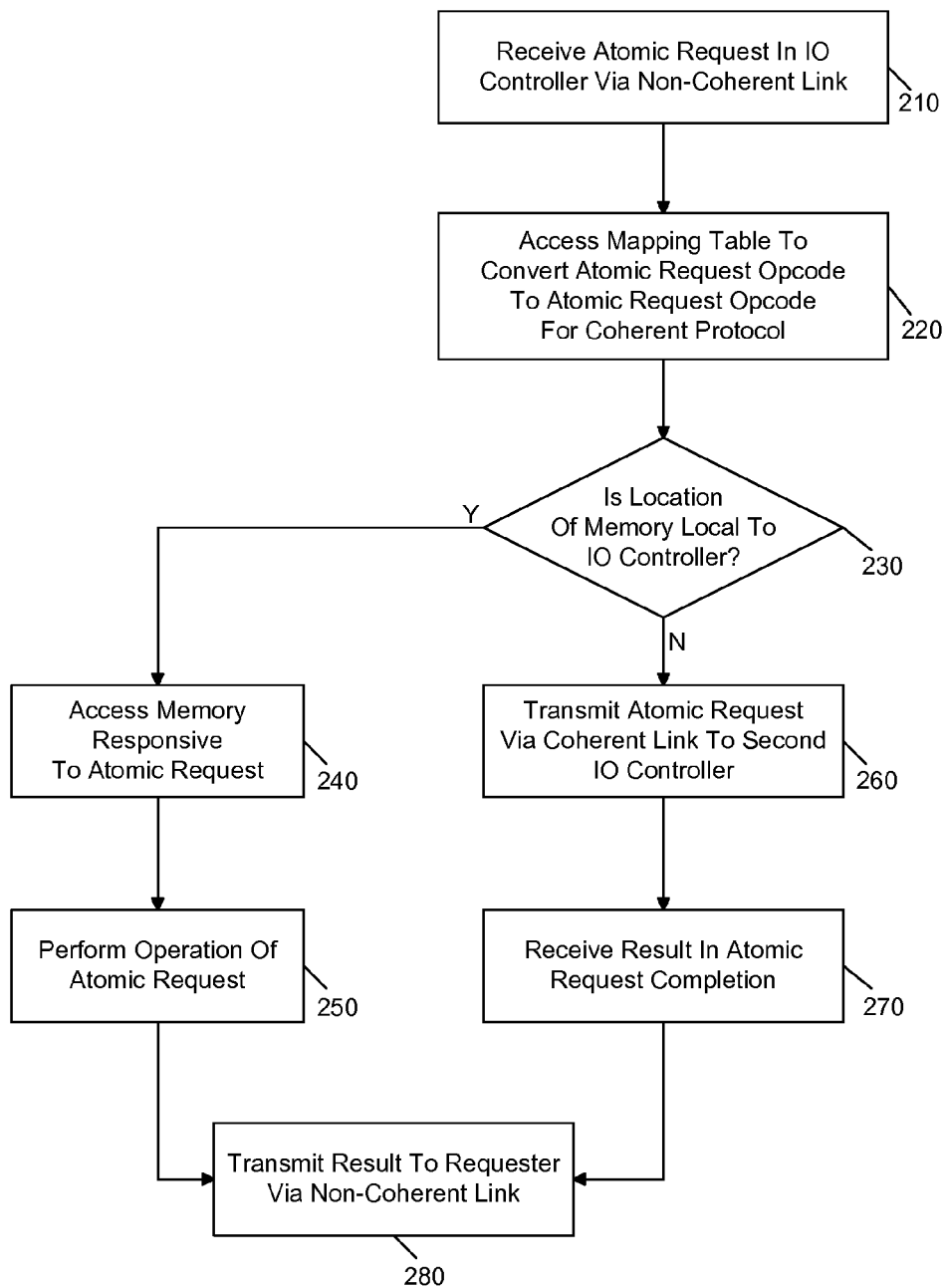
FIG. 2 is a flow diagram of a method detailing operations performed by a root complex in accordance with an embodiment of the present invention.
Figure 3:
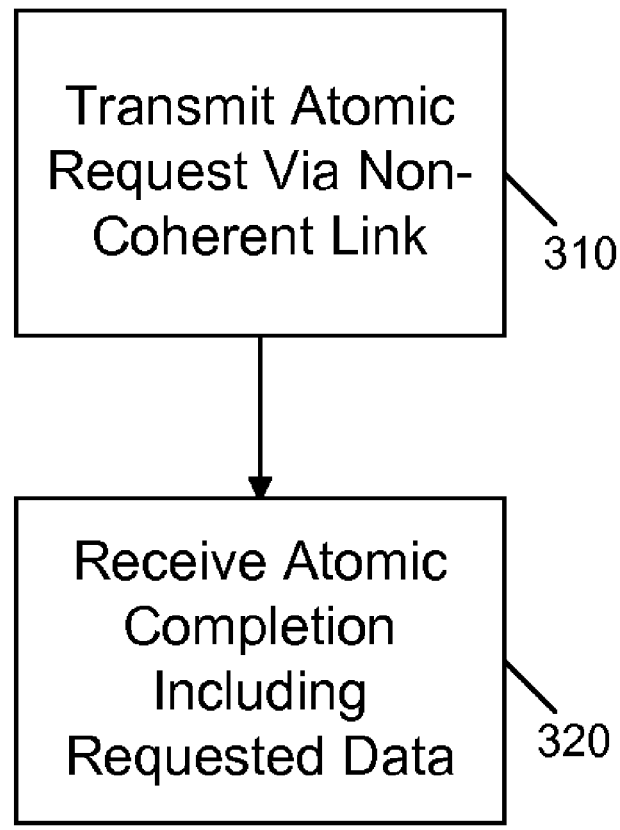
FIG. 3 is a flow diagram of a method detailing operations performed by a requester agent in accordance with an embodiment of the present invention.
Figure 4:
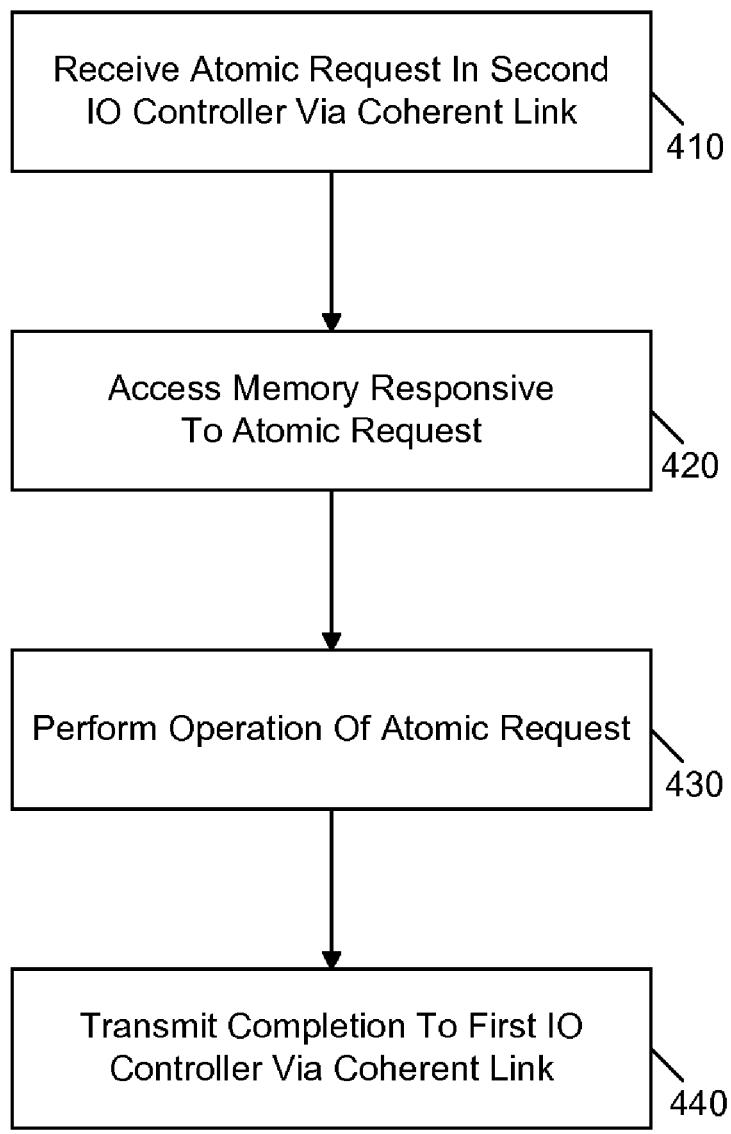
FIG. 4 is a flow diagram of a method detailing operations performed by a target agent that receives a coherent atomic request in accordance with one embodiment of the present invention.

FIGS. 2-4 show flow diagrams of handling atomic operations from the point of view of the receiving agent (i.e., of the root complex), the requesting agent, and the completing agent, respectively. Referring now to FIG. 2, shown is a flow diagram of a method detailing operations performed by a root complex in accordance with an embodiment of the present invention. As shown in FIG. 2, method 200 may begin by receiving an atomic request in an IO controller via a non-coherent link (block 210). Using this request, a mapping table may be accessed to convert the atomic request opcode to an atomic request opcode for a coherent protocol (block 220). As discussed above, in one such implementation the received non-coherent atomic request may be according to a PCIe™ protocol, while the coherent opcode may be according to a QPI protocol. Next it may be determined whether the location of the target memory is local to the IO controller (diamond 230). In one embodiment, this determination may be made by reference to a routing table, which may compare a range of the virtual address provided by the requestor to a range of addresses for different portions of system memory coupled to different system agents.

If it is determined that the request is for a location local to the IO controller, the IO controller may access the memory responsive to the atomic request (block 240). For example, the IO controller may access a mapping table such as a direct memory access (DMA) map present in the IO controller to translate the received virtual address to a physical address for a location in the local memory. If this mapping is not present in the mapping table, an appropriate page walking mechanism may be performed to obtain the translation.

Still referring to FIG. 2, when the JO controller receives the requested data from the local memory, it may perform the requested operation of the atomic request (block 250). The various atomic operations may occur as discussed above. On obtaining a result, in addition to writing the result back to the memory for storage, the IO controller may further transmit the result to the requestor via the non-coherent link (block 280). In one embodiment, this result may be passed via a non-coherent completion responsive to the original non-coherent atomic operation.

Still referring to FIG. 2, if instead it is determined that the location of the target memory is not locally present, control passes to block 260 where the coherent atomic request may be transmitted via a coherent link to another agent, e.g., the home agent that owns the target memory location (block 260). This agent may then perform the requested atomic operation and provide the result back to the IO controller via a coherent atomic completion (block 270). This result may then be returned, as discussed above at block 280.

From the point of view of the requester, reference can be made to FIG. 3. As seen in FIG. 3, method 300 may being by transmitting an atomic request via a non-coherent link (block 310). This non-coherent device may transmit any one of a number of selected atomic operations, all of which generally may include an opcode corresponding to the atomic operation to be performed, possibly one or more operands to be used in the atomic operation, and a target memory location at which an operand is to be obtained and/or to which a result is to be written. Then after the atomic operation is completed, the peripheral device may receive an atomic completion including requested data (block 320). Note that although the operation is performed atomically at the appropriate location of the completer, the peripheral device need not wait for the result to return before performing other work. Accordingly, in the time between blocks 310 and 320, the peripheral device may perform useful work unrelated to the atomic operation.

Referring now to FIG. 4, shown is a flow diagram of the operations performed by a target agent that receives a coherent atomic operation. Specifically, method 400 may begin by receiving an atomic request in a second IO controller via a coherent link. With reference back to FIG. 1, this second controller may be IIO $114_1$ present in second processor $110_1$. Still referring to FIG. 4, when the IO controller receives the coherent atomic request from the coherent link, it may access its local memory (by reference to a local page table to indicate the physical location of the target memory) to obtain the data at the target memory location (block 420). Then it may perform the requested operation of the atomic request (block 430). The various atomic operations may occur as discussed above. On obtaining a result, in addition to passing the result back to its local memory for storage, the IO controller may further transmit a completion to the original completer, namely the IO controller directly coupled to the device requester, via the coherent link (block 440). In one embodiment, this completion may include the result, and may be passed via a coherent completion responsive to the coherent atomic request received via the coherent link. While shown with this particular set of operations and agents in the embodiments described in FIGS. 2-4, understand that the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a non-coherent atomic request in a first agent from a device coupled to the first agent via a non-coherent link;
accessing a mapping table of the first agent to convert the non-coherent atomic request into a coherent atomic request; and
transmitting the coherent atomic request via a coherent link to a second agent coupled to the first agent via the coherent link to cause the second agent to be a completer of the non-coherent atomic request.

2. The method of claim 1, further comprising receiving in the first agent an atomic completion including a result of an atomic operation performed by the second agent corresponding to the coherent atomic request.

3. The method of claim 1, further comprising determining whether a target memory location of the non-coherent atomic request is local to the first agent and if so, accessing data at the target memory location responsive to the non-coherent atomic request, otherwise transmitting the coherent atomic request to the second agent.

4. The method of claim 3, wherein the second agent is local to a memory including the target memory location.

5. The method of claim 4, wherein the second agent performs the atomic operation, stores a result of the atomic operation in the target memory location, and sends a coherent atomic completion to the first agent to indicate completion of the atomic operation.

6. The method of claim 5, further comprising receiving the coherent atomic completion in the first agent and accessing the mapping table of the first agent to obtain a non-coherent atomic completion.

7. The method of claim 6, further comprising transmitting the result within the non-coherent atomic completion to the device via the non-coherent link.

8. An apparatus comprising:
a first agent to receive an atomic request for a requested operation from a device coupled to the first agent via a non-coherent link, the first agent including a mapping table having a plurality of entries each to map a non-coherent transaction to a coherent transaction, at least some of the entries including a mapping between a non-coherent atomic operation code and a corresponding coherent atomic operation code, wherein responsive to receipt of a non-coherent atomic operation code of the atomic request the first agent is to transmit the coherent atomic operation code to a second agent coupled to the first agent via a coherent link, to cause the second agent to perform the requested operation of the atomic request.

9. The apparatus of claim 8, wherein the first agent comprises a root complex for the device and wherein the atomic request is of a protocol that calls for the root complex to be the completer of the atomic request.

10. The apparatus of claim 9, wherein the coherent atomic operation code is to cause the second agent to be the completer of the atomic request.

11. The apparatus of claim 8, wherein the first agent is to receive a completion for the requested operation from the second agent via the coherent link and to generate a non-coherent completion for transmission to the device.

12. The apparatus of claim 8, wherein the first agent is to perform the requested operation responsive to the atomic request only if a target memory location of the atomic request is local to the first agent.

13. The apparatus of claim 12, wherein the apparatus comprises a processor including a plurality of cores and an integrated input/output controller corresponding to the first agent.

14. The apparatus of claim 13, wherein the processor is coupled to a second processor via the coherent link, the second processor including the second agent.

15. A system comprising:
a first processor including at least one first core, a first memory controller coupled to a first local memory, and a first controller to communicate with a device coupled to the first processor via a non-coherent link, the first controller to receive an atomic request for a requested operation from the device and access a mapping table to map a non-coherent atomic operation code of the atomic request to a corresponding coherent atomic operation code, and to transmit the coherent atomic operation code to a second processor coupled to the first processor via a coherent link, to cause the second processor to perform the requested operation of the atomic request;

the second processor including at least one second core, a second memory controller coupled to a second local memory, and a second controller to receive the coherent atomic operation code, perform the requested operation responsive to the coherent atomic operation code to obtain a result, store the result in the second local memory, and provide a completion for the atomic request to the first controller; and the device coupled to the first processor via the non-coherent link and to generate the atomic request, wherein the first controller comprises a root complex for the device and the atomic request is of a protocol that calls for the root complex to be the completer of the atomic request.

16. The system of claim 15, wherein the first controller includes a routing table having a plurality of entries each to indicate an address range for a local memory coupled to a processor.

17. The system of claim 16, wherein the first controller is to route the coherent atomic operation to the second processor based on information in the routing table.

18. The system of claim 15, wherein the first controller is to receive the completion and to access the mapping table to obtain a non-coherent completion corresponding to the completion.

19. The system of claim 18, wherein the first controller is to send the non-coherent completion to the device to indicate successful completion of the requested operation, and the device is to perform at least one unrelated operation after transmission of the atomic request to the first processor and before receipt of the non-coherent completion.

20. The system of claim 15, further comprising a scalable node controller coupled to the first processor to receive a second atomic request from the first processor to perform a requested operation in a memory coupled to the scalable node controller that is owned by the first processor.

* * * * *